(12) United States Patent
Leutgeb et al.

(10) Patent No.: US 8,081,725 B2
(45) Date of Patent: Dec. 20, 2011

(54) EDGE EVALUATION OF ASK-MODULATED SIGNALS

(75) Inventors: Thomas Leutgeb, Lieboch (AT); Helmut Koroschetz, Lieboch (AT); Walter Kargl, Graz (AT)

(73) Assignee: Infineon Technologies AG (DE)

( * ) Notice: Subject to any disclaimer, the term of this patent is extended or adjusted under 35 U.S.C. 154(b) by 1310 days.

(21) Appl. No.: 11/548,844

(22) Filed: Oct. 12, 2006

(65) Prior Publication Data

US 2008/0026712 A1    Jan. 31, 2008

(30) Foreign Application Priority Data

Jul. 27, 2006   (DE) .......................... 10 2006 034 826

(51) Int. Cl.
 *H04L 7/02*   (2006.01)
(52) U.S. Cl. .................. 375/360; 455/130; 329/347
(58) Field of Classification Search ............... 375/360; 455/130; 329/347
See application file for complete search history.

(56) References Cited

U.S. PATENT DOCUMENTS

| | | | |
|---|---|---|---|
| 2002/0153902 A1 | 10/2002 | Thiel et al. | |
| 2004/0104767 A1* | 6/2004 | Prexl et al. | 329/347 |
| 2006/0028342 A1 | 2/2006 | Choi et al. | |
| 2007/0025421 A1 | 2/2007 | Shattil | |
| 2008/0026712 A1* | 1/2008 | Leutgeb et al. | 455/130 |
| 2008/0246541 A1 | 10/2008 | Kranabenter | |

FOREIGN PATENT DOCUMENTS

| | | |
|---|---|---|
| DE | 199 27 320 A1 | 12/2000 |
| DE | 102 29 460 B3 | 1/2004 |
| EP | 1 231 557 A2 | 8/2002 |

\* cited by examiner

*Primary Examiner* — David C. Payne
*Assistant Examiner* — Tanmay Shah
(74) *Attorney, Agent, or Firm* — Dickstein Shapiro LLP

(57) ABSTRACT

Signal processing circuit including a demodulator that receives a receive signal with signal edges, and outputs a demodulated receive signal with transitions from a first level to a second level or vice versa at signal edges of the receive signal, wherein points of time of the transitions depend on the steepnesses of the signal edges. The circuit also includes an edge evaluator that receives the receive signal, and outputs an evaluation signal which includes information about the steepnesses of the signal edges. The circuit also includes a signal generator that receives the output of the demodulator, receives the output of the edge evaluator, and outputs a corrected demodulated receive signal with transitions whose points of time are set with regard to the points of time of the transitions of the demodulated receive signal based on the evaluation signal in order to reduce influences of different steepnesses of the signal edges.

26 Claims, 3 Drawing Sheets

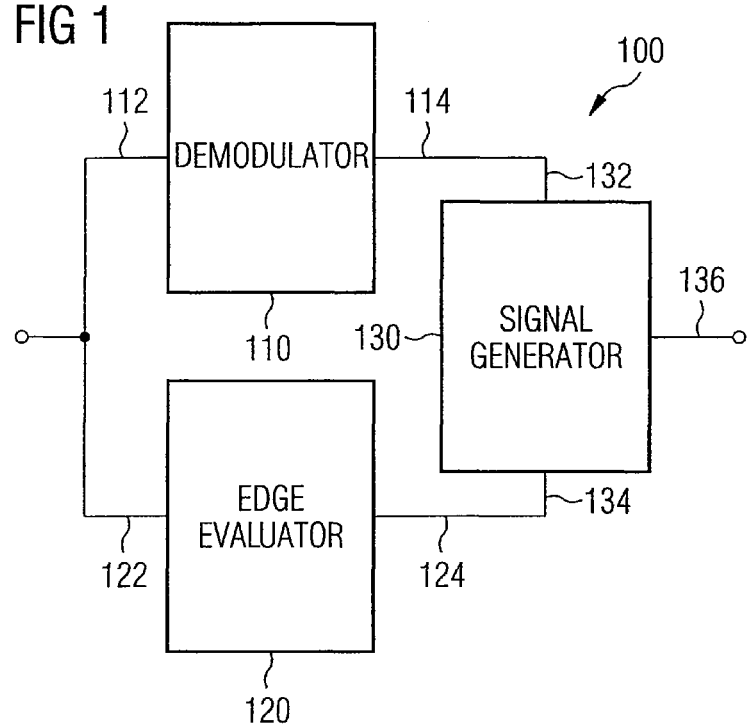
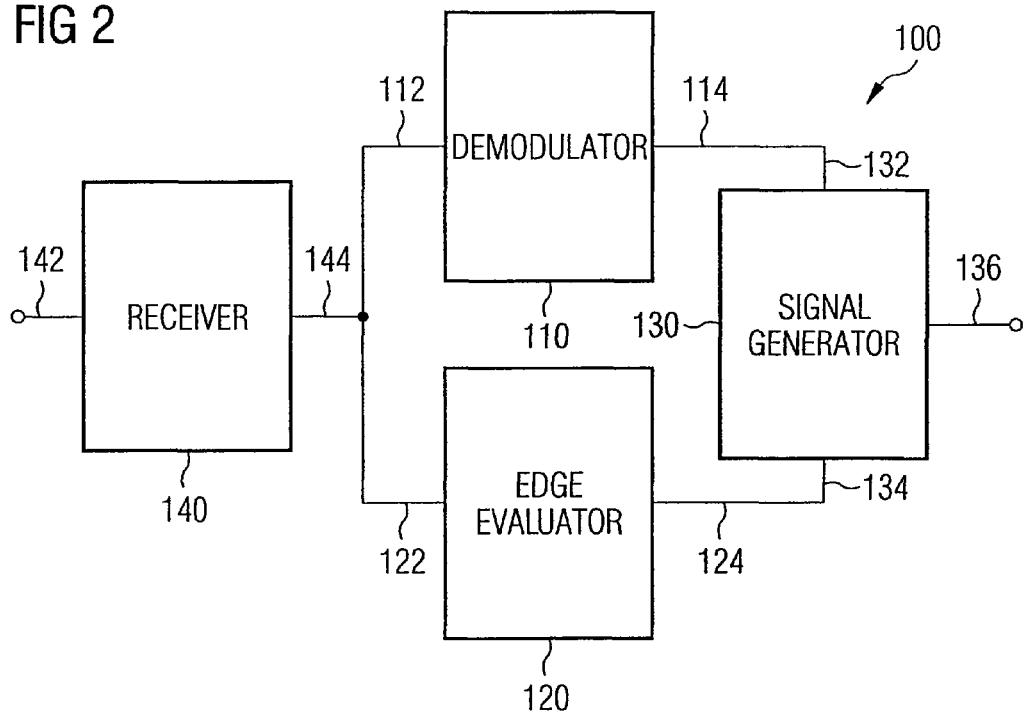

EDGE EVALUATION OF ASK-MODULATED SIGNALS

CROSS-REFERENCE TO RELATED APPLICATION

This application claims priority from German Patent Application No. 10 2006 034 826.5, which was filed on Jul. 27, 2006, and is incorporated herein by reference in its entirety.

BACKGROUND

The present invention relates to a signal processing circuit for the demodulation of amplitude-modulated signals, like they occur, for example, in RFID systems.

The amplitude shift keying (ASK) is a digital modulation type which has found many areas of use due to its low-effort signal processing. It is, for example, used in RFID systems (radio frequency identification), which enable a wireless identification of a transponder and a data transmission. Further areas of use of the amplitude shift keying may, for example, be found in the area of radio clocks where a carrier signal transmits current time and datum information for a time synchronization. A further example are so-called beacons for a location determination. Here, a carrier signal is modulated with a continuous tone in the audio field for an easier identification, the audio tone itself is again correspondingly modulated (sampled) according to a desired Morse code, so that via the aimed at overall system both the direction and also the identification of the transmitter itself is enabled. The so-called on-off keying (OOK) can be mentioned as the simplest variant of amplitude shift keying. In this method, a carrier signal is switched on or off, respectively, to transmit a binary "1" or a binary "0".

The envelope of an ASK-modulated signal is illustrated at the top of FIG. 4. FIG. 4 shows two signal courses. The top signal course $U_{ASK}$ shows the envelope of an ASK-modulated signal. The bottom signal course shows a signal $U_{DEM}$, which is extracted when demodulating from the signal $U_{ASK}$. Here, threshold value decisions are made, which means that the signal $U_{ASK}$ is evaluated regarding thresholds designated by $U_{THR1}$ and $U_{THR2}$ in FIG. 4. The demodulator now decides for a signal value $U_2$ if a falling signal edge in the signal $U_{ASK}$ falls low of the threshold $U_{THR1}$, as it is, for example, illustrated in FIG. 4 at a first transition. If the signal $U_{ASK}$ exceeds a second threshold $U_{THR2}$ in a rising signal edge, then the demodulator decides for the value $U_1$, as it is indicated as an example in FIG. 4 at the second rising signal edge of the signal $U_{ASK}$. Two exemplary signal values for $U_1$ and $U_2$ are indicated at the bottom in FIG. 4 for clarification. It is to be noted, that the points of time of level changes in the demodulated signal $U_{DEM}$ depend on the edge steepness of the envelope of the ASK-modulated signal $U_{ASK}$. The flatter, for example, a falling signal edge in the signal $U_{ASK}$ is, the later the threshold $U_{THR1}$ is fallen short of, and for a rising signal edge the same holds true with regard to exceeding the second threshold $U_{THR2}$, and the later consequently a change of the level takes place in the demodulated signal $U_{DEM}$.

In particular when the course of the envelope $U_{ASK}$ comprises different signal edges with different steepnesses, additionally a corruption of the symbol durations in the demodulated signal $U_{DEM}$ results. In FIG. 4 this is illustrated as an example. The signal course of $U_{ASK}$ shows a flatly falling input edge and a steeper rising output edge in the area marked by dashed lines. The first signal level change in the demodulated signal $U_{DEM}$ takes place relatively late due to the flatly falling signal edge, whereas the second level change in the demodulated signal $U_{DEM}$ takes place relatively early, as the rising signal edge is steeper and consequently $U_{THR2}$ is exceeded earlier. The result is that the duration of time the signal $U_{DEM}$ remains on the level $U_2$, as it is designated in FIG. 4 by $\Delta T_{2'}$, is shorter than the duration of the original pulse, designated by $\Delta T_2$ in FIG. 4, which modulated the carrier in the transmitter. If the signal $U_{DEM}$ is supplied to such a detector, then, depending on the temporal corruption in relation to the symbol duration, errors may result. Errors of this type are frequently observed in connection with RFID systems. The ASK signals defined in the standard ISO 1443 combined with the tolerances of a PICC (proximity integrated chip card) applied with RFID systems lead to a high error-proneness in the demodulation method illustrated in FIG. 4.

BRIEF SUMMARY

According to one embodiment, the present invention includes a signal processing circuit including a demodulator having an input for receiving a receive signal, which includes signal edges, and an output for outputting a demodulated receive signal which includes a transition from a first level to a second level or vice versa with signal edges of the receive signal, wherein points of time of the transitions depend on the steepnesses of the signal edges. Further, the signal processing circuit includes an edge evaluator having an input for receiving the receive signal, and an output for outputting an evaluation signal which includes information about the steepnesses of the signal edges. Further, the signal processing circuit includes a signal generator with a first input coupled to the output of the demodulator, a second input coupled to the output of the edge evaluator, and an output for outputting a corrected demodulated receive signal which includes signal edges, whose points of time with regard to points of time of the transitions of the demodulated receive signal are set based on the evaluation signal in order to reduce influences of different steepnesses of the signal edges.

According to one embodiment, the present invention further provides a method for generating a corrected demodulated receive signal having a step of receiving a receive signal which includes signal edges; a step of demodulating the receive signal to generate a demodulated receive signal which, with signal edges of the receive signal, includes a transition from a first level to a second level or vice versa, wherein points of time of the transitions depend on the steepnesses of the signal edges; a step of evaluating the edges of the receive signal to generate an evaluation signal which includes information about the steepnesses of the edges, and further a step of setting the points of time of the transitions of the demodulated receive signal based on the evaluation signal for generating a corrected demodulated receive signal to reduce influences of different steepnesses or signal edges.

Thus, embodiments of the present invention comprise the advantage that by additionally monitoring the signal edges of the receive signal a higher interference immunity may be achieved or a bit error ratio (BER) may be reduced, respectively. The reduction of the bit error ratio has the direct consequence that information may be transmitted faster and more reliably.

BRIEF DESCRIPTION OF THE SEVERAL VIEWS OF THE DRAWINGS

Embodiments of the present invention are explained in more detail in the following with reference to the accompanying drawings, in which:

FIG. 1 shows a basic block diagram of an embodiment of the present invention;

FIG. 2 shows a basic block diagram of a further embodiment of the present invention;

DETAILED DESCRIPTION

Figure 3:
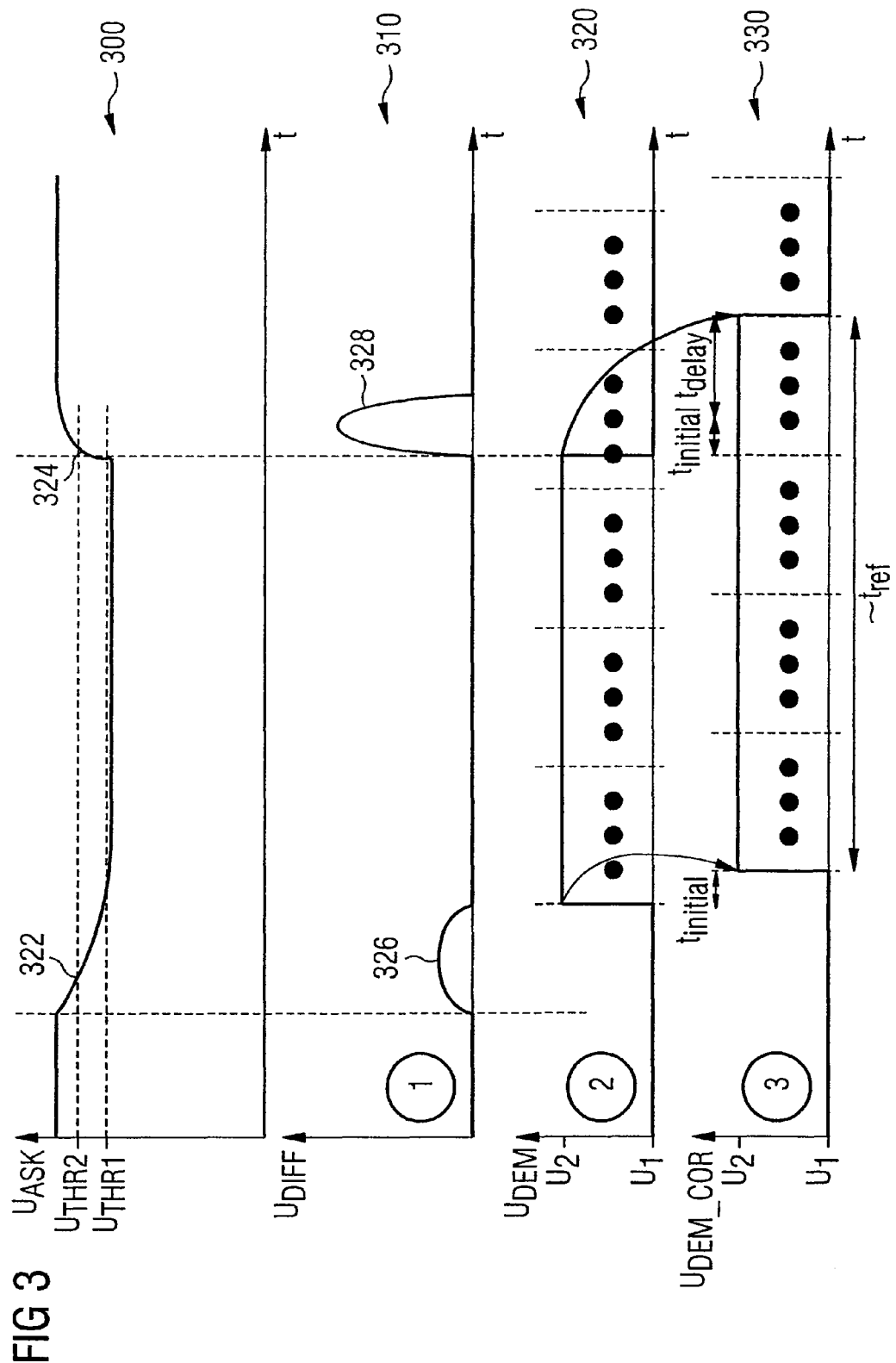
FIG. 3 shows basic signal courses of an inventive embodiment.
Figure 4:
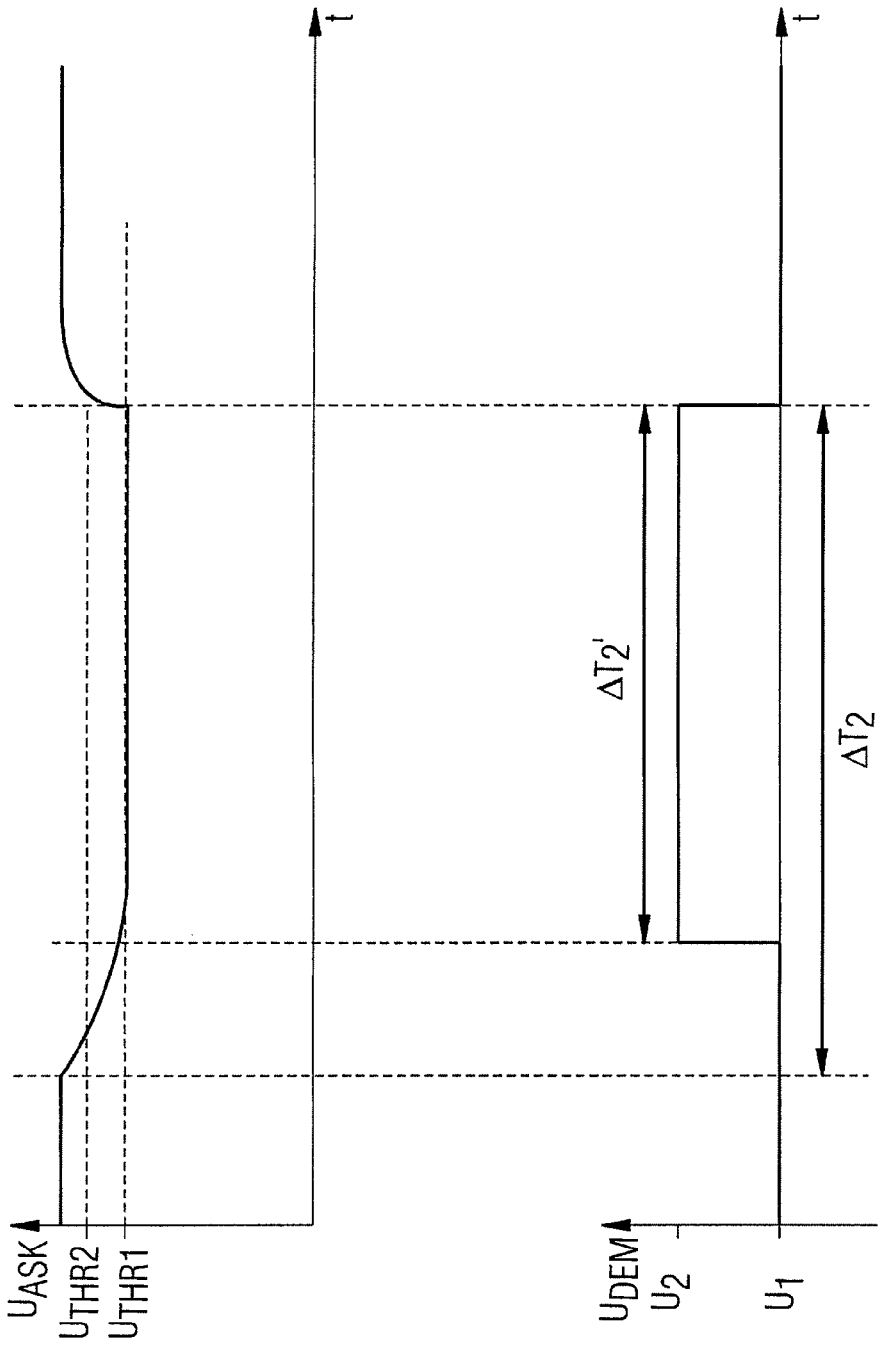
FIG. 4 shows basic signal courses of a conventional demodulation process of an amplitude-modulated signal.

A basic block diagram of an embodiment of the present invention is illustrated in FIG. 1. FIG. 1 shows a signal processing circuit 100. The signal processing circuit 100 includes a demodulator 110 comprising an input terminal 112 and an output terminal 114, an edge evaluator 120 having an input terminal 122 and an output terminal 124, and a signal generator 130 with a first input terminal 132, a second input terminal 134 and an output terminal 136. At the input 112 of the demodulator 110 and at the input 122 of the edge evaluator 120 a receive signal is applied which comprises signal edges.

The output 114 of the demodulator 110 is connected to the input 132 of the signal generator 130. The demodulator 110 provides at its output 114 a demodulated receive signal which, with signal edges of the receive signal, comprises a transition from a first level to a second level or vice versa, wherein a point of time of a transition depends on the steepness of the signal edges in the receive signal.

At its input 122, the edge evaluator 120 also receives the receive signal with the signal edges. At its output 124, the edge evaluator 120 provides an evaluation signal comprising information about the steepness of the signal edges in the receive signal. The output 124 of the edge evaluator 120 is connected to the input 134 of the signal generator 130.

At its output 136, the signal generator 130 provides a corrected demodulated receive signal comprising signal edges whose points of time are set relative to points of time of the transitions of the demodulated receive signal on the basis of the evaluation signal in order to reduce influences of different steepnesses of the signal edges.

In its evaluation signal, the edge evaluator 120 provides information about the edges of the receive signal. This information may, for example, be expressed in an amplitude of the evaluation signal. In another embodiment, the information about the signal edges of the receive signal may be reflected in pulses which the edge evaluator 120 provides in an evaluation signal, whereupon the signal generator 130 sets points of time of the transitions in the corrected demodulated receive signal on the basis of the amplitude of the pulses.

Additionally, in a further embodiment, the signal generator 130 may temporally delay the transitions of the corrected demodulated receive signal with regard to the transitions in the demodulated receive signal, wherein in this way shifts depending on the signal edges may be compensated. For example, the delays might be set in the corrected demodulated receive signal so that they are proportional to a pulse intensity in the evaluation signal.

The edge evaluator 120, in the evaluation, might, for example, provide a differentiated receive signal so that the signal edges occur as pulses in the evaluation signal after the differentiation. In another embodiment, the signal generator 130 may basically consider that the time period between two transitions in the corrected demodulated receive signal may only correspond to an integer multiple of a symbol duration. In one embodiment, the corrected demodulated receive signal is supplied to a sampler whose samples are again supplied to a decoder. As it is known that the receive signal is comprised of symbols of a certain symbol duration, already the signal generator 130 may consider those symbol durations in order to modify the corrected demodulated receive signal based on the information about the signal edges of the receive signal which it obtained via the evaluation signal.

A main advantage of the present invention now, for example, results from the fact that in the case of RFID applications transponders may be identified more reliably and faster or data may be made available faster, respectively. For example with the application of radio-controlled clocks, the same may receive and indicate the signal faster which consists of a current time information and a datum information. In the area of beacons, i.e. in the area of location and position determination, by the present invention on the one hand the determination of the position itself may be accelerated and performed in a shorter time, and further a more accurate position determination is enabled. Especially in the field of disaster control, like, e.g., in the search and rescue of injured persons, the invention presented here may provide decisive advantages.

A further advantage of an embodiment of the present invention comes into play with the use of RFID systems in passports for a contactless determination of the particulars of travelers, or their biometrical data, respectively. As using the present invention RFID chips may be read out faster and in a more interference-proof way, a direct advantage results in the handling of travelers, for example at airports, railway stations and in trains.

A further embodiment is illustrated in FIG. 2. According to FIG. 2, in addition to the elements of FIG. 1 a receiver 140 is provided. At an input terminal 142 the receiver 140 receives a high-frequency signal and provides the receive signal for the demodulator 110 and the edge evaluator 120 at its output terminal 144. This receive signal may be the envelope of an amplitude-modulated high-frequency signal (e.g. according to the standard ISO 14443), like it is, for example, used in ASK methods.

For illustrating a realization of an embodiment, in FIG. 3 four signal courses are illustrated. The first signal course 300 shows the envelope $U_{ASK}$ of an amplitude-modulated signal. The receive signal $U_{ASK}$ forms the input signal for an edge evaluator 120, as it is illustrated in FIGS. 1 and 2. In the present realization of an embodiment the edge evaluator is a differentiator, and in the signal course 310 in FIG. 3 the evaluation signal $U_{DIFF}$ is illustrated. Further, the signal $U_{ASK}$ forms the input/receive signal for the demodulator 110, as it is illustrated in FIGS. 1 and 2. The demodulated receive signal or the output signal $U_{DEM}$ of the demodulator 110, respectively, is also illustrated in the signal course 320 in FIG. 3.

The demodulator 110 demodulates the envelope $U_{ASK}$ for example by a threshold value position. Here it is known, that the signal $U_{DEM}$ assumes two signal values. If the signal $U_{ASK}$ falls short of a first threshold value indicated as $U_{THR1}$ in the signal course 300 with a falling signal edge, the demodulated signal $U_{DEM}$ assumes a signal value $U_2$, and if the signal $U_{ASK}$ exceeds a second threshold value $U_{THR2}$ with a rising signal edge, then the output signal $U_{DEM}$ assumes a signal value $U_1$. Both signal values $U_1$ and $U_2$ are exemplarily indicated in the signal course 320. The signal generator 130, as it is illustrated in FIGS. 1 and 2, now generates a corrected demodulated signal $U_{DEM\_COR}$, based on the differentiated input signal or the evaluation signal $U_{DIFF}$ and the demodulated receive signal $U_{DEM}$, respectively. By differentiating the envelope $U_{ASK}$ the evaluation signal $U_{DIFF}$ results which contains information about the signal edges of the enveloping signal or the receive signal $U_{ASK}$, respectively.

As it is indicated in FIG. 3, the receive signal $U_{ASK}$ comprises a falling signal edge 322 and a rising signal edge 324. The falling signal edge 322 comprises a flat course, whereas the rising signal edge 324 comprises a steeper course. This effect is reflected in the signal course 310 of the differentiated signal $U_{DIFF}$. It may be seen that the evaluation signal $U_{DIFF}$ for the incoming flat signal edge 322 provides a flat wide pulse 326, whereas the evaluation signal $U_{DIFF}$ for the outgoing steeper signal edge 324 provides a shorter pulse 328 with a larger amplitude. The differentiated receive signal or the evaluation signal $U_{DIFF}$, respectively, is used now to shift the signal edges in the demodulated receive signal $U_{DEM}$, as it is indicated in the signal course 320 in FIG. 3. The higher the amplitude of a pulse in the differentiated signal $U_{DIFF}$, the further a signal edge is shifted in the signal $U_{DEM}$, wherefrom the corrected demodulated signal $U_{DEM\_COR}$ in the signal course 330 results. From the pulse with a low amplitude 326 in the evaluation signal $U_{DIFF}$ for the incoming signal edge 322, thus a relatively short delay $t_{initial}$ for the first signal edge in the corrected demodulated signal $U_{DEM\_COR}$ results. From the second pulse 328 in the differentiated receive signal $U_{DIFF}$ which comprises a higher amplitude than the first pulse, a correspondingly larger temporal delay $t_{delay}$ results for the second signal edge in the corrected demodulated signal $U_{DEM\_COR}$. This way, in the corrected demodulated signal $U_{DEM\_COR}$ a signal course is achieved which again corresponds to an original signal course which was used in a transmitter for modulation.

In the signal course 330 this is illustrated by the time $t_{ref}$. The maximum signal edge shift in the corrected demodulated signal $U_{DEM\_COR}$ is selected such that it corresponds to a maximum temporal shift which is caused by extremely flat signal edges. The reference time $t_{ref}$ corresponds to an integer multiple of symbol durations. This effect is clarified by samples indicated in the signal courses 320 and 330. Individual symbol durations are designated by dashed lines in the signal courses 320 and 330. In the signal courses 320 and 330 it may be seen that per symbol duration three samples are formed, which is indicated by black dots in the signal courses 320 and 330. In the signal course 320 of the demodulated signal $U_{DEM}$ it is further illustrated that due to the different signal edges of the receive signal $U_{ASK}$ the signal edge of the demodulated signal $U_{DEM}$ of the last symbol occurs too early. This has as a consequence that during the last symbol at least two samples indicate a wrong signal value and for this reason errors may result.

In the signal course 330 of the corrected demodulated signal $U_{DEM\_COR}$ the signal edges are shifted accordingly and it may be seen that also for the last symbol three correct samples are formed. This means, that the corrected demodulated receive signal $U_{DEM\_COR}$, as compared to the demodulated signal $U_{DEM}$, is shifted backwards, wherein the time between the individual signal edges is corrected so that the time period between two signal edges again comprises an integer multiple of symbol durations. By this, a higher stability and a lower error proneness are achieved. The individual samples in the signal courses 320 and 330 illustrate this effect. If the demodulated signal $U_{DEM}$ was supplied to a decoder in the embodiment here, which decides on the individual transmit symbols according to a principle of majority rule, the same would erroneously decide for the last symbol. In the corrected demodulated signal $U_{DEM\_COR}$ this would not be the case any more, which again clarifies the advantage of the present invention.

In the present inventive embodiment information about different signal edges and different edge steepnesses both of the rising and also the falling signal edges are given to the signal generator 130 by differentiating. The same is now able, based on the information, to generate a corrected demodulated signal $U_{DEM\_COR}$ and thus to increase the stability of a transmission. The amplitude of the differentiated enveloping signal $U_{ASK}$ here controls the temporal shift in the corrected demodulated signal $U_{DEM\_COR}$ and thus reduces the disadvantageous effects caused by the different signal edges in the receive signal $U_{ASK}$. This principle is applicable in all areas of application of contactless communication.

As an alternative to the differentiation which is performed in the present embodiment within the edge evaluator 120, an evaluation signal might also be generated in a different way. It is, for example, possible to characterize a signal edge by several threshold values. The steeper a signal edge is, the shorter would the time between two events of exceeding or falling short of threshold values, respectively, be. This way, further a signal might be generated which contains information about the signal edges of the enveloping signal $U_{ASK}$ and from which a signal generator might generate a corresponding corrected receive signal.

By the present invention, a great advantage regarding the stability in contactless communications, like, for example, in RFID applications, in radio-controlled clocks or in position determination is achieved. As by the present invention the stability and the robustness of a transmission are increased, the reliability of such applications is increased. In particular the reliability in a position determination may bring substantial advantages, for example, regarding applications in disaster control.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A signal processing circuit, comprising:
a receiver comprising an input for receiving an amplitude-modulated signal and an output for outputting an envelope of the amplitude-modulated signal;
a demodulator having an input coupled to the output of the receiver for receiving the envelope of the amplitude-modulated signal as a receive signal which includes signal edges, and an output for outputting a demodulated receive signal which includes, at signal edges of the receive signal, transitions from a first level to a second level or vice versa, wherein points of time of the transitions depend on steepness of the signal edges;
an edge evaluator having an input coupled to the output of the receiver to receive the envelope of the amplitude-modulated signal as the receive signal, and an output for outputting an evaluation signal which includes information about the steepnesses of the signal edges; and
a signal generator having a first input which is coupled to the output of the demodulator, a second input which is coupled to the output of the edge evaluator, and an output for outputting a corrected demodulated receive signal which includes transitions whose points of time are set relative to the points of time of the transitions of the demodulated receive signal based on the evaluation signal in order to reduce influences of different steepnesses of the signal edges.

2. The signal processing circuit according to claim 1, wherein the transitions are set based on an amplitudes of the evaluation signal.

3. The signal processing circuit according to claim 1, wherein the evaluation signal includes pulses associated with transitions in the demodulated receive signal, and points of time of the transitions in the corrected demodulated receive signal are set based on the amplitudes of the pulses.

4. The signal processing circuit according to claim 1, wherein in the corrected demodulated receive signal transitions include delays with regard to transitions in the demodulated receive signal.

5. The signal processing circuit according to claim 4, wherein the delays are set to be proportional to pulse amplitudes in the evaluation signal.

6. The signal processing circuit according to claim 1, wherein the points of time of transitions in the corrected demodulated receive signal are set such that a time between two transitions corresponds to an integer multiple of a symbol duration.

7. The signal processing circuit according to claim 6, wherein the edge evaluator comprises a differentiator.

8. The signal processing circuit according to claim 1, wherein the input of the receiver receives an ASK signal.

9. The signal processing circuit according to claim 1, wherein the input of the receiver receives a signal according to the standard ISO 14443.

10. The signal processing circuit according to claim 1, wherein the input of the receiver receives an OOK signal.

11. The signal processing circuit according to claim 1, wherein the demodulator comprises a threshold value decision unit.

12. A device for generating a corrected demodulated receive signal, comprising:
  a means for receiving an amplitude-modulated signal at an input and for outputting an envelope of the amplitude-modulated signal at an output;
  a means for demodulating having an input coupled to the output of the means for receiving in order to receive the amplitude-modulated signal as a receive signal, said means for demodulating being configured to demodulate the receive signal and to generate a demodulated receive signal which includes transitions from a first level to a second level or vice versa at signal edges of the receive signal, wherein points of time of the transitions depend on steepnesses of the signal edges;
  a means for evaluating having an input coupled to the output of the means for receiving in order to receive the amplitude-modulated signal as the receive signal, said means for evaluating being configured to generate an evaluation signal; and
  a means for generating the corrected demodulated receive signal which includes transitions whose points of time are set with regard to points of time of the transitions of the demodulated receive signal based on the evaluation signal in order to reduce influences of different steepnesses of the signal edges.

13. The device according to claim 12, wherein the means for generating comprises a means for generating the corrected demodulated receive signal based on an amplitude of the evaluation signal.

14. The device according to claim 12, wherein the means for evaluating comprises a means for generating pulses in the evaluation signal at points of time at which transitions take place in the receive signal.

15. The device according to claim 12, wherein the means for generating comprises a means for generating transitions in the corrected demodulated receive signal which includes delays relative to the transitions in the demodulated receive signal.

16. The device according to claim 15, wherein the means for generating comprises a means for setting the delays such that they are proportional to a pulse intensity in the evaluation signal.

17. The device according to claim 15, wherein the means for generating comprises a means for setting the delays such that the time between two transitions in the corrected demodulated receive signal corresponds to an integer multiple of a symbol duration.

18. The device according to claim 12, wherein the means for evaluating comprises a differentiator.

19. The device according to claim 12, wherein the means for receiving comprises a means for receiving amplitude-modulated signals.

20. The device according to claim 12, wherein the means for receiving comprises a means for receiving ASK signals or signals according to the standard ISO 14443.

21. A signal processing circuit, comprising:
  a receiver comprising an input for receiving an amplitude-modulated signal and an output for outputting an envelope of the amplitude-modulated signal;
  a demodulator having an input coupled to the output of the receiver to receive the envelope of the amplitude-modulated signal as a receive signal including signal edges, and an output for outputting a demodulated receive signal which includes transitions from a first level to a second level or vice versa at signal edges of the receive signal, wherein points of time of the transitions depend on steepnesses of the signal edges;
  an edge evaluator having a differentiator including an input coupled to the output of the receiver to receive the envelope of the amplitude-modulated signal as the receive signal, and an output for outputting an evaluation signal which includes information about steepnesses of the signal edges; and
  a signal generator having a first input coupled to the output of the demodulator, a second input coupled to the output of the edge evaluator, and an output for outputting a corrected demodulated receive signal which includes transitions whose points of time include delays with regard to points of time of the transitions of the demodulated receive signal based on the evaluation signal and are proportional to pulse amplitudes in the evaluation signal, and wherein the delays are set to reduce influences of different steepnesses of the signal edges.

22. A method for generating a corrected demodulated receive signal, comprising:
  receiving an amplitude-modulated signal and generating an envelope of the amplitude-modulated signal as a receive signal which includes signal edges;
  demodulating the receive signal to generate a demodulated receive signal which includes transitions from a first level to a second level or vice versa at signal edges of the receive signal, wherein points of time of the transitions depend on steepnesses of the signal edges;
  evaluating the edges of the receive signal to generate an evaluation signal which includes information about the steepnesses of the signal edges; and
  generating the corrected demodulated receive signal by setting points of time of transitions in the corrected demodulated receive signal relative to the points of time of transitions of the demodulated receive signal based on the evaluation signal in order to reduce influences of different steepnesses of the signal edges.

23. The method according to claim 22, wherein the step of setting the points of time of the transitions of the corrected demodulated receive signal takes place based on associated pulses in the evaluation signal.

24. The method according to claim 23, wherein the step of setting includes inserting delays, whose durations are based on intensities of the pulses in the evaluation signal, between the transitions in the demodulated receive signal and in the corrected demodulated receive signal.

25. The method according to claim 22, wherein the step of evaluating comprises differentiating the receive signal.

26. The method according to claim 22, wherein the step of receiving comprises determining an envelope of an ASK signal.

* * * * *